(12) United States Patent
Chen et al.

(10) Patent No.: US 11,789,558 B1
(45) Date of Patent: Oct. 17, 2023

(54) DISPLAY DEVICE AND DRIVING METHOD THEREOF

(71) Applicant: AUO Corporation, Hsinchu (TW)

(72) Inventors: Ya-Ting Chen, Hsinchu (TW); Sheng-Wen Cheng, Hsinchu (TW)

(73) Assignee: AUO Corporation, Hsinchu (TW)

( * ) Notice: Subject to any disclaimer, the term of this patent is extended or adjusted under 35 U.S.C. 154(b) by 0 days.

(21) Appl. No.: 18/070,331

(22) Filed: Nov. 28, 2022

(30) Foreign Application Priority Data

Aug. 30, 2022 (TW) .................................. 111132671

(51) Int. Cl.
*G06F 3/041* (2006.01)
*H01Q 1/22* (2006.01)
*H01Q 21/06* (2006.01)
*G06F 3/044* (2006.01)

(52) U.S. Cl.
CPC ............. *G06F 3/0416* (2013.01); *H01Q 1/22* (2013.01); *H01Q 21/061* (2013.01); *G06F 3/044* (2013.01); *G06F 2203/04112* (2013.01)

(58) Field of Classification Search
None
See application file for complete search history.

(56) References Cited

U.S. PATENT DOCUMENTS

| 11,126,229 | B2 | 9/2021 | Chen et al. | |
| 2016/0190678 | A1* | 6/2016 | Hong | H01Q 1/44 343/700 MS |
| 2021/0223934 | A1* | 7/2021 | Kim | G06F 3/04164 |

FOREIGN PATENT DOCUMENTS

| CN | 108319392 | 7/2018 |
| CN | 111045548 | 4/2020 |

\* cited by examiner

*Primary Examiner* — Stephen T. Reed
(74) *Attorney, Agent, or Firm* — JCIPRNET

(57) ABSTRACT

A display device includes a substrate, touch antenna units and switch circuits. The touch antenna units are arrayed above the substrate, wherein each touch antenna unit includes a first loop electrode. The first loop electrode is completely located in a display area of the display device, and has a first end and a second end. Each of the switch circuits is electrically connected to the first end and the second end of the first loop electrode in a corresponding touch antenna unit.

16 Claims, 8 Drawing Sheets

DISPLAY DEVICE AND DRIVING METHOD THEREOF

CROSS-REFERENCE TO RELATED APPLICATION

This application claims the priority benefit of Taiwan application serial no. 111132671, filed on Aug. 30, 2022. The entirety of the above-mentioned patent application is hereby incorporated by reference herein and made a part of this specification.

BACKGROUND

Technical Field

The disclosure relates to a display device and a driving method thereof.

Description of Related Art

With the advancement and development of science and technology, traditional display products that only have the function of displaying images may no longer meet the requirements of consumers. Therefore, in order to increase the competitiveness of products, many manufacturers have attempted to add additional functions to their products. For example, in existing mobile phones, there are often additional functions such as touch function, fingerprint recognition function, face recognition function, wireless transaction payment function, etc. These functions provide consumers with a more convenient lifestyle. Among these additional functions, the wireless transaction payment function is one of the most widely followed functions in recent years. Consumers only need to carry a mobile phone with a near-field communication (NFC) function to shop in multiple stores, which greatly improves the convenience of consumers. Generally speaking, in a mobile phone with both short-range wireless communication function and touch function, the antenna is attached to the outside of the touch device. However, the eddy current effect generated by the antenna interferes with the touch signal in the touch device.

SUMMARY

The disclosure provides a display device and a driving method thereof. The display device of the disclosure integrates the antenna and the touch device, which may not only improve the problem of mutual interference between the antenna and the touch device, but also reduce the production cost.

At least one embodiment of the disclosure provides a display device. The display device includes a substrate, multiple touch antenna units, and multiple switch circuits. The touch antenna units are arrayed above the substrate, in which each of the touch antenna units includes a first loop electrode. The first loop electrode is completely located in a display area of the display device, and has a first end and a second end. Each of the switch circuits is electrically connected to the first end and the second end of the first loop electrode in a corresponding touch antenna unit.

At least one embodiment of the disclosure provides a driving method of a display device, including the following operation. A display device is provided, which includes a substrate, multiple touch antenna units, and multiple switch circuits. The touch antenna units are arrayed above the substrate. Each of the touch antenna units includes a first loop electrode and a second loop electrode. The first loop electrode is completely located in a display area of the display device, and has a first end and a second end. The first loop electrode surrounds the second loop electrode, and the second loop electrode has a third end and a fourth end. Each of the switch circuits is electrically connected to the first end and the second end of the first loop electrode, and the third end and the fourth end of the second loop electrode in a corresponding touch antenna unit. Each of the touch antenna units includes a touch mode and an antenna mode. One of the touch antenna units and a corresponding switch circuit are switched to the touch mode, and another one of the touch antenna units and another corresponding switch circuit are switched to the antenna mode.

DETAILED DESCRIPTION OF DISCLOSED EMBODIMENTS

Figure 1:
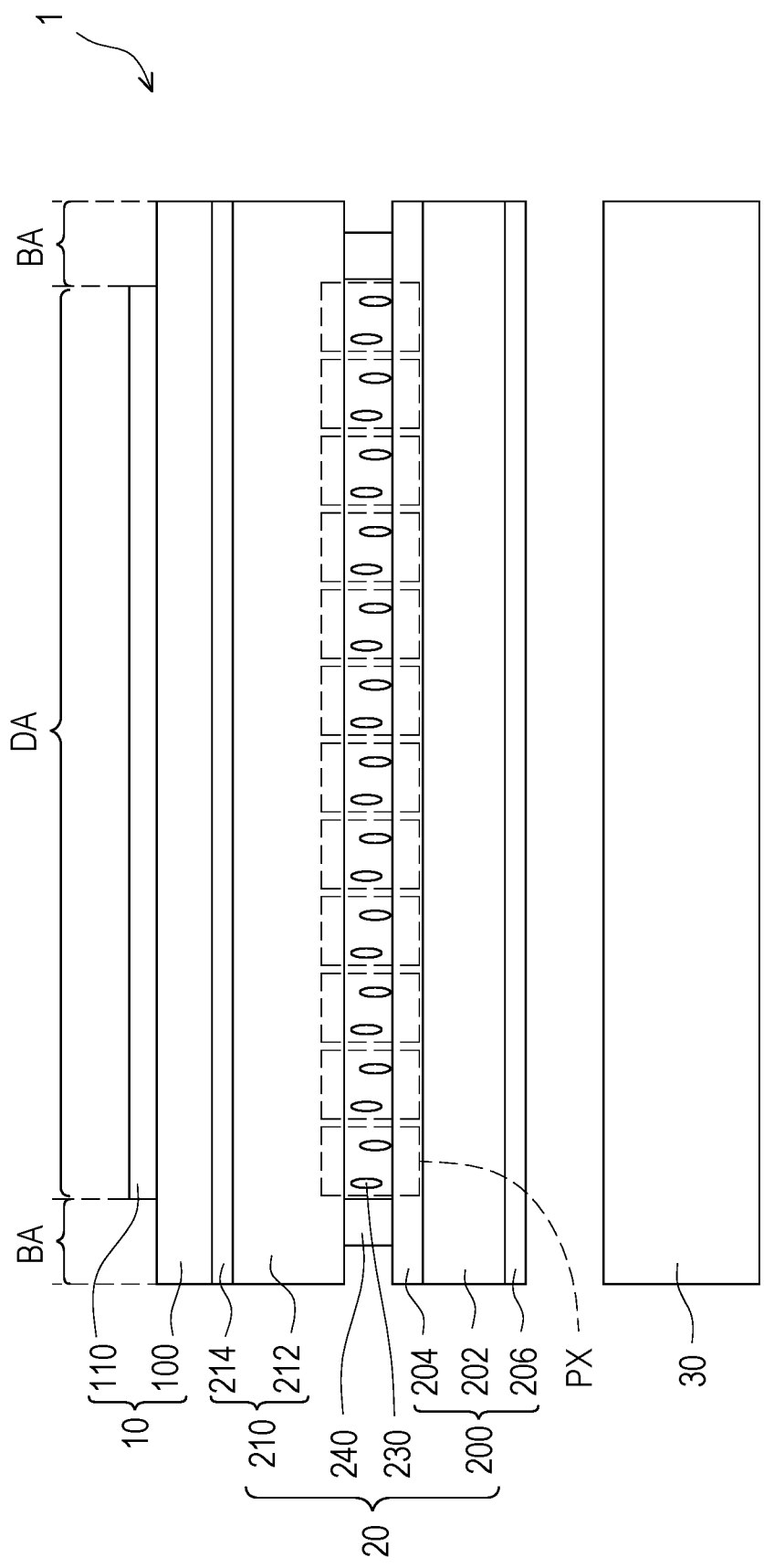
FIG. 1 is a cross-sectional schematic view of a display device according to an embodiment of the disclosure.

FIG. 1 is a cross-sectional schematic view of a display device according to an embodiment of the disclosure. Referring to FIG. 1, the display device 1 includes a touch device 10 and a display panel 20. In this embodiment, the display panel 20 is a liquid crystal display panel, and the display device 1 further includes a backlight module 30, but the disclosure is not limited thereto. In other embodiments, the display panel 20 is an organic light emitting diode display panel, a micro light emitting diode display panel, a reflective liquid crystal display panel, or other suitable display panels, and the backlight module 30 may be omitted.

The touch device 10 includes a substrate 100 and multiple touch antenna units 110 located on the substrate 100. In FIG. 1, the touch antenna units 110 are simply represented by rectangles, and for the structure of the touch antenna units 110, refer to the subsequent drawings and related descriptions. In some embodiments, the material of the substrate 100 may be glass, quartz, organic polymer, or other suitable materials.

The display panel 20 includes a pixel array substrate 200, a filter element substrate 210, a liquid crystal 230, and a sealant 240. The pixel array substrate 200 includes a first substrate 202, an active element layer 204, and a first polarizer 206. The active element layer 204 and the first polarizer 206 are respectively located on both sides of the first substrate 202. The filter element substrate 210 includes a second substrate 212, a second polarizer 214, and a filter element (not shown). The second polarizer 214 and the filter element are respectively located on both sides of the second substrate 212. The liquid crystal 230 is located between the pixel array substrate 200 and the filter element substrate 210, and the sealant 240 surrounds the liquid crystal 230.

In this embodiment, the touch device 10 is an out-cell touch device, and the substrate 100 of the touch device 10 is attached to the display panel 20 by an adhesive layer (not shown). In other embodiments, the touch device is an on-cell touch device or an in-cell touch device. In this case, the touch antenna unit 110 may be directly formed on or in the display panel 20, and the substrate 100 may be omitted. In other words, in other embodiments, the touch antenna unit is formed on the pixel array substrate 200 or the filter element substrate 210.

In this embodiment, the display device 1 includes a display area DA and a border area BA. For example, the area inside the sealant 240 is the display area DA, and the area outside the sealant 240 is the border area BA. Multiple pixels PX are disposed in the display area DA. The touch antenna units 110 are also disposed in the display area DA, and each of the touch antenna units 110 overlaps the pixels PX.

Figure 2A:
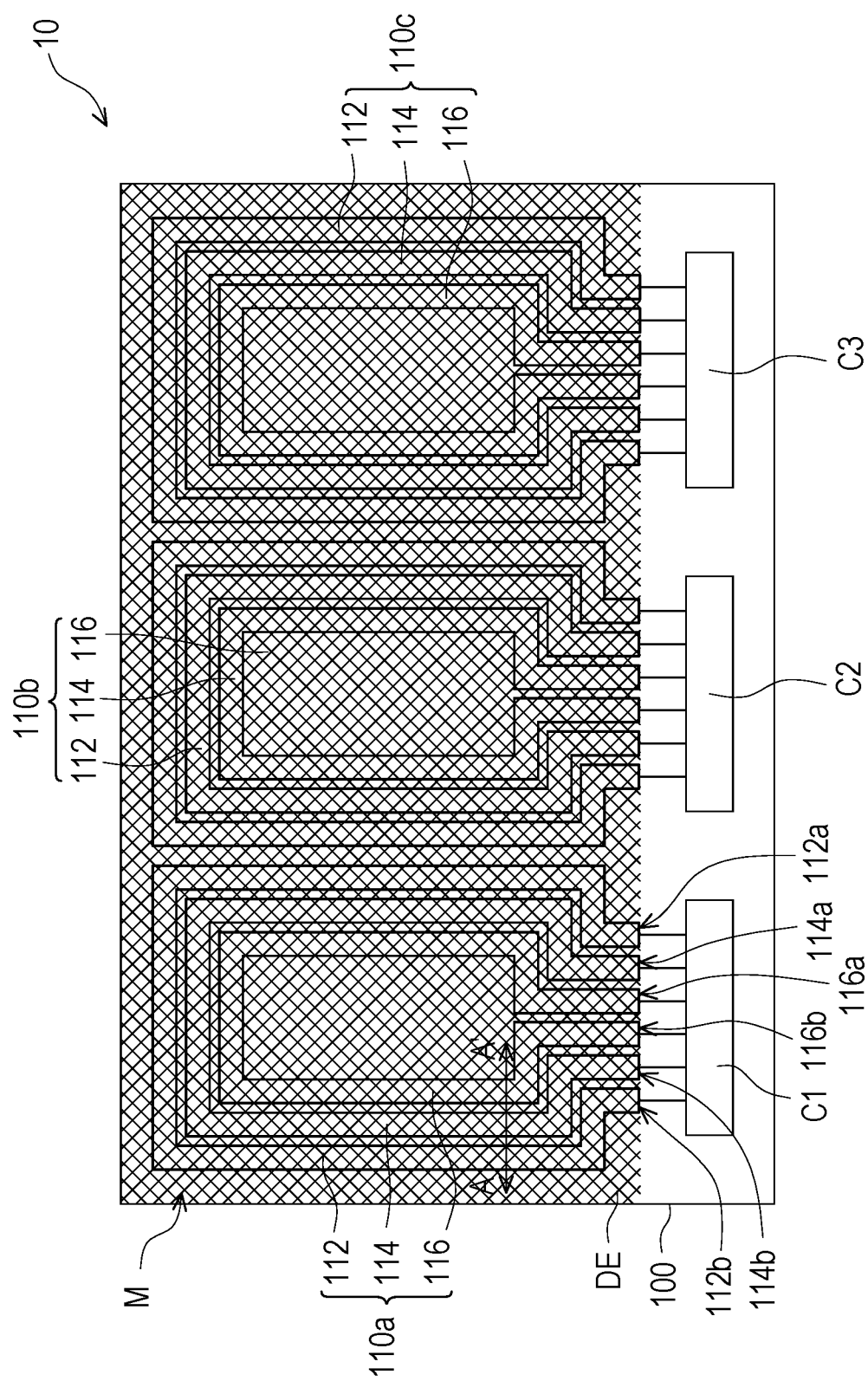
FIG. 2A is a top schematic view of a touch device according to an embodiment of the disclosure.
Figure 2B:
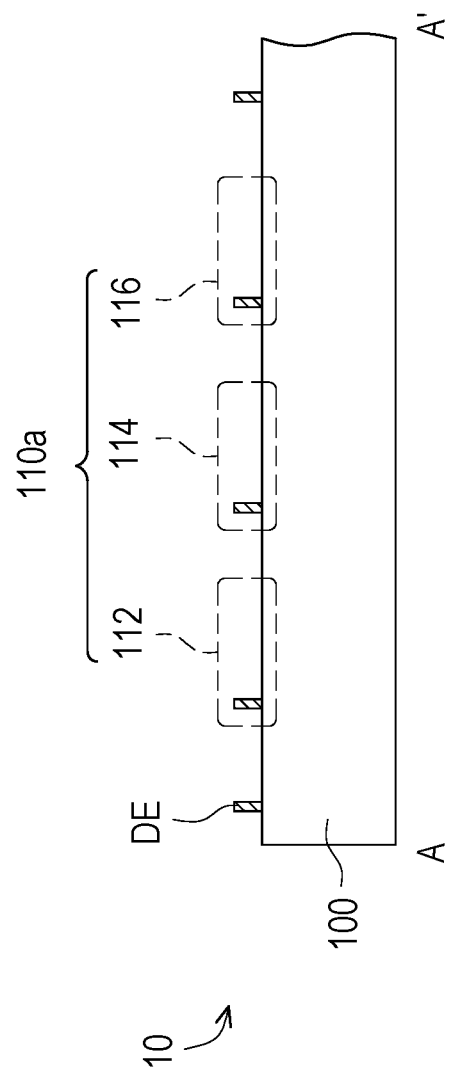
FIG. 2B is a cross-sectional schematic view along a line A-A' of FIG. 2A.

FIG. 2A is a top schematic view of a touch device according to an embodiment of the disclosure. FIG. 2B is a cross-sectional schematic view along a line A-A' of FIG. 2A. It is noted that the embodiment of FIG. 2A and FIG. 2B uses the reference numerals and a part of the contents of the embodiment of FIG. 1, and the same or similar reference numerals are used to denote the same or similar elements, and the description of the same technical content is omitted. For the description of the omitted portion, reference may be made to the foregoing embodiment, and details are not described herein.

Referring to FIG. 2A and FIG. 2B, the touch device 10 includes a substrate 100 and the touch antenna units 110a, 110b, and 110c located on the substrate 100. In some embodiments, the touch device 10 further includes dummy electrodes DE.

The touch antenna units 110a, 110b, and 110c are arrayed above the substrate 100, in which the touch antenna unit 110b is located between the touch antenna unit 110a and the touch antenna unit 110c.

The touch antenna units 110a, 110b, and 110c respectively include a first loop electrode 112, a second loop electrode 114, and a third loop electrode 116. The first loop electrode 112, the second loop electrode 114, and the third loop electrode 116 are all completely located in the display area of the display device (referring to FIG. 1). The first loop electrode 112 surrounds the second loop electrode 114, and the second loop electrode 114 surrounds the third loop electrode 116. In some embodiments, the first loop electrode 112, the second loop electrode 114, and the third loop electrode 116 respectively overlap the pixels in the display area (referring to FIG. 1).

The dummy electrode DE is located between the first loop electrode 112 and the second loop electrode 114, between the second loop electrode 114 and the third loop electrode 116, in the middle of the third loop electrode 116, and between the adjacent touch antenna units 110a, 110b, and 110c. In some embodiments, the dummy electrodes DE are at least partially located in the display area of the display device (referring to FIG. 1).

In some embodiments, the first loop electrode 112, the second loop electrode 114, the third loop electrode 116, and the dummy electrode DE are metal meshes separated from each other. For example, by defining multiple dividing lanes on the metal mesh structure M, the first loop electrode 112, the second loop electrode 114, the third loop electrode 116, and the dummy electrode DE separated from each other are obtained. In FIG. 2A, the thicker lines on the metal mesh structure M are the dividing lanes for separating the first loop electrode 112, the second loop electrode 114, the third loop electrode 116, and the dummy electrode DE. It should be noted that the metal mesh structure M in FIG. 2A is only for illustration, and the mesh size and line width of the metal mesh structure M may be adjusted according to actual requirements.

Each of the switch circuits C1, C2, and C3 is electrically connected to the corresponding touch antenna units 110a, 110b, and 110c. In this embodiment, the switch circuits C1, C2, and C3 are respectively electrically connected to the touch antenna units 110a, 110b, and 110c. Each of the switch circuit C1, C2, and C3 is electrically connected to the first end 112a and the second end 112b of the corresponding first loop electrode 112, the third end 114a and the fourth end 114b of the corresponding second loop electrode 114, and the fifth end 116a and the sixth end 116b of the corresponding third loop electrode 116. In this embodiment, the first end 112a and the second end 112b of the first loop electrode 112, the third end 114a and the fourth end 114b of the second loop electrode 114, and the fifth end 116a and the sixth end 116b of the third loop electrode 116 are all located on the same side (the lower side of the metal mesh structure M in FIG. 2A). Therefore, the wiring space between the touch antenna units 110a, 110b, and 110c and the switch circuits C1, C2, and C3 may be reduced, to obtain the advantage of a narrow border.

In this embodiment, the switch circuits C1, C2, and C3 are located in the border area of the display device (referring to FIG. 1). In some embodiments, the switch circuits C1, C2, and C3 may be formed directly on the substrate 100. In other embodiments, the switch circuits C1, C2, and C3 are disposed in a chip (not shown) or a circuit board (not shown) externally connected to the substrate 100.

Figure 3A:
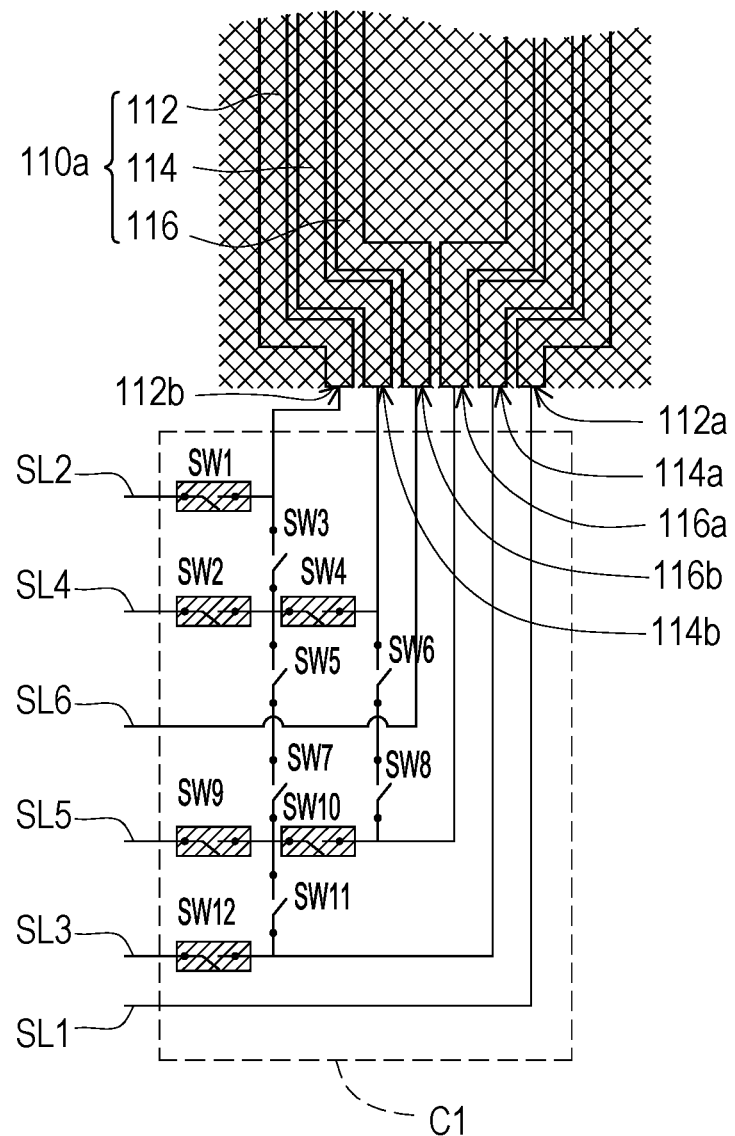
FIG. 3A is a schematic view of a touch antenna unit and a switch circuit in a touch mode according to an embodiment of the disclosure.
Figure 3B:
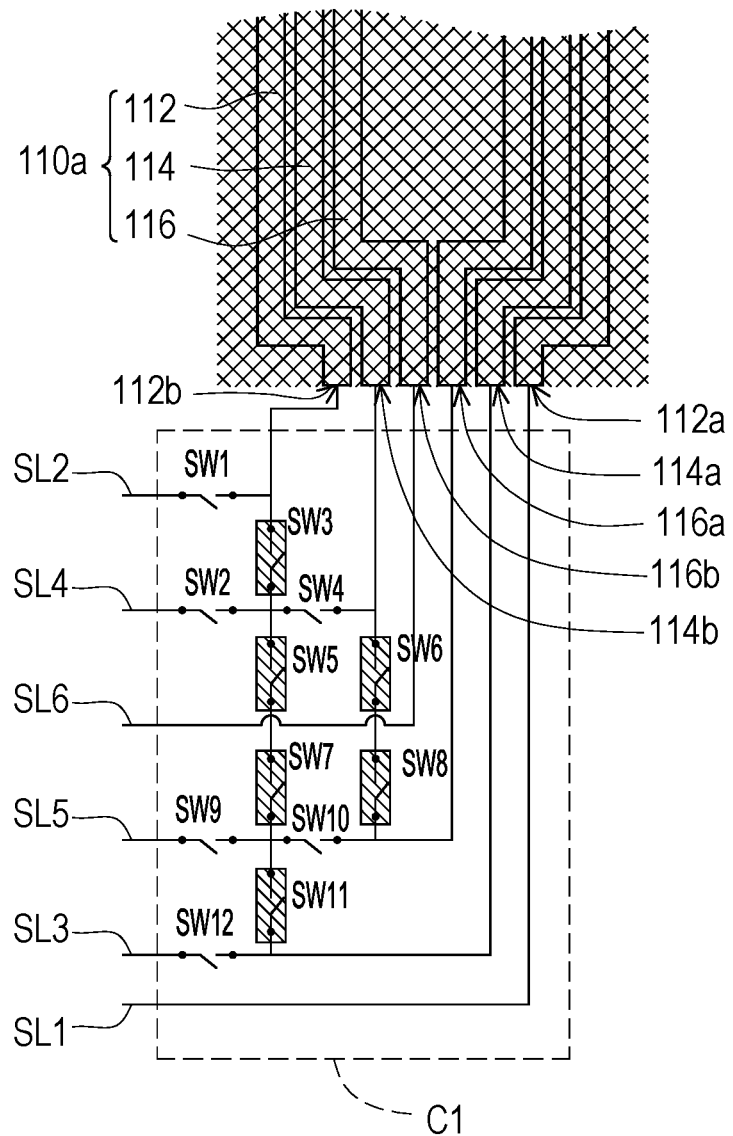
FIG. 3B is a schematic diagram of a touch antenna unit and a switch circuit in an antenna mode according to an embodiment of the disclosure.
Figure 3C:
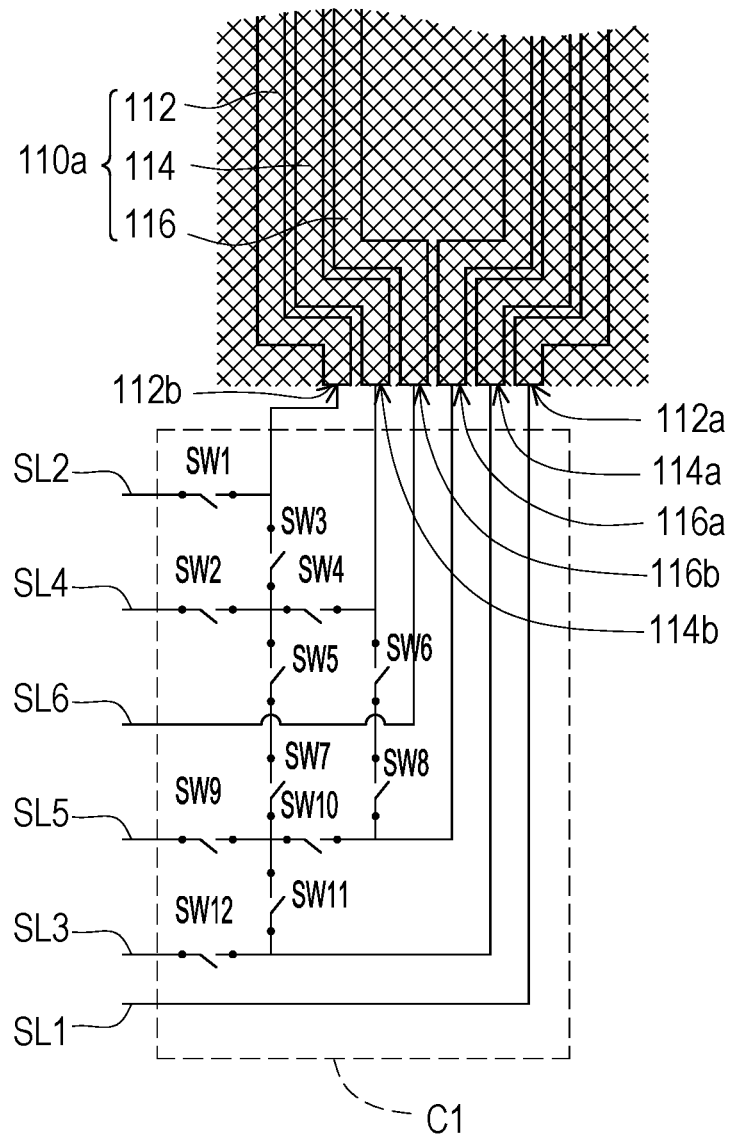
FIG. 3C is a schematic view of a touch antenna unit and a switch circuit in an interval mode according to an embodiment of the disclosure.

In this embodiment, the switch circuits C1, C2, and C3 may independently switch the touch antenna units 110a, 110b, and 110c between the touch mode (referring to FIG. 3A), the antenna mode (referring to FIG. 3B), and the interval mode (referring to FIG. 3C). The switch circuits C1, C2, and C3 have similar circuit structures. FIG. 3A to FIG. 3C take the touch antenna unit 110a and the switch circuit C1 as examples to illustrate various modes of the touch antenna unit and the switch circuit. For various modes of the switch circuits C2 and C3 and the touch antenna units 110b and 110c, reference may be made to the switch circuit C1 and the touch antenna unit 110a in FIG. 3A to FIG. 3C, and details are not described herein again.

FIG. 3A is a schematic view of a touch antenna unit and a switch circuit in a touch mode according to an embodiment of the disclosure. In FIG. 3A, the switch circuit C1 includes a first switch SW1 to a twelfth switch SW12, and the switch circuit C1 is electrically connected to the first signal line SL1, the second signal line SL2, the third signal line SL3, the fourth signal line SL4, the fifth signal line SL5, and the sixth signal line SL6. The switches in the on state in the diagram are marked with a slanted line pattern, which may allow current to pass; switches that are not marked with a slanted line pattern in the diagram are in the off state, which cannot allow current to pass.

The first signal line SL1 is electrically connected to the first end 112a of the first loop electrode 112.

One end of the first switch SW1 and one end of the third switch SW3 are electrically connected to the corresponding second end 112b of the first loop electrode 112, and the other end of the first switch SW1 is electrically connected to the second signal line SL2.

One end of the fourth switch SW4 and one end of the sixth switch SW6 are electrically connected to the corresponding fourth end 114b of the second loop electrode 114.

The other end of the third switch SW3 is electrically connected to one end of the second switch SW2, one end of the fifth switch SW5, and the other end of the fourth switch SW4, and the other end of the second switch SW2 is electrically connected to the fourth signal line SL4.

The sixth signal line SL6 is electrically connected to the sixth end 116b of the third loop electrode 116.

The other end of the fifth switch SW5 is electrically connected to one end of the seventh switch SW7. The other end of the sixth switch SW6 is electrically connected to one end of the eighth switch SW8.

The other end of the eighth switch SW8 and one end of the tenth switch SW10 are electrically connected to the corresponding fifth end 116a of the third loop electrode 116.

The other end of the tenth switch SW10 is electrically connected to one end of the ninth switch SW9, one end of the eleventh switch SW11, and the other end of the seventh switch SW7, and the other end of the ninth switch SW9 is electrically connected to the fifth signal line SL5.

The other end of the eleventh switch SW11 and one end of the twelfth switch SW12 are electrically connected to the corresponding third end 114a of the second loop electrode 114, and the other end of the twelfth switch SW12 is electrically connected to the third signal line SL3.

In the touch mode, the first switch SW1, the second switch SW2, the fourth switch SW4, the ninth switch SW9, the tenth switch SW10, and the twelfth switch SW12 are switched to the on state, and the third switch SW3, the fifth switch SW5, the sixth switch SW6, the seventh switch SW7, the eighth switch SW8, and the eleventh switch SW11 are switched to the off state.

In the touch mode, the first end 112a of the first loop electrode 112 is electrically connected to the first signal line SL1 through the corresponding switch circuit C1. The second end 112b of the first loop electrode 112 is electrically connected to the second signal line SL2 through the corresponding switch circuit C1. The first signal line SL1 is electrically connected to the second signal line SL2 through the switch circuit C1 and the first loop electrode 112. In some embodiments, in the touch mode, the first signal line SL1 and the second signal line SL2 are suitable for transmitting and/or receiving touch signals. In some embodiments, in the touch mode, the second signal line SL2 is electrically connected to the working voltage, and the first signal line SL1 is electrically connected to the ground voltage.

In the touch mode, the third end 114a of the second loop electrode 114 is electrically connected to the third signal line SL3 through the corresponding switch circuit C1. The fourth end 114b of the second loop electrode 114 is electrically connected to the fourth signal line SL4 through the corresponding switch circuit C1. The third signal line SL3 is electrically connected to the fourth signal line SL4 through the switch circuit C1 and the second loop electrode 114. In some embodiments, in the touch mode, the third signal line SL3 and the fourth signal line SL4 are suitable for transmitting and/or receiving touch signals. In some embodiments, in the touch mode, the fourth signal line SL4 is electrically connected to the working voltage, and the third signal line SL3 is electrically connected to the ground voltage.

In the touch mode, the fifth end 116a of the third loop electrode 116 is electrically connected to the fifth signal line SL5 through the corresponding switch circuit C1, and the sixth end 116b of the third loop electrode 116 is electrically connected to the sixth signal line SL6 through the corresponding switch circuit C1. The fifth signal line SL5 is electrically connected to the sixth signal line SL6 through the switch circuit C1 and the third loop electrode 116. In some embodiments, in the touch mode, the fifth signal line SL5 and the sixth signal line SL6 are suitable for transmitting and/or receiving touch signals. In some embodiments, in the touch mode, the sixth signal line SL6 is electrically connected to the working voltage, and the fifth signal line SL5 is electrically connected to the ground voltage.

In the touch mode, the first loop electrode 112, the second loop electrode 114, and the third loop electrode 116 may be used as independent and separated touch electrodes. For example, the first loop electrode 112, the second loop electrode 114, and the third loop electrode 116 may all be used as touch electrodes of a self-capacitive touch device.

FIG. 3B is a schematic view of a touch antenna unit and a switch circuit in an antenna mode according to an embodiment of the disclosure.

In the antenna mode, the third switch SW3, the fifth switch SW5, the sixth switch SW6, the seventh switch SW7, the eighth switch SW8, and the eleventh switch SW11 are switched to the on state, and the first switch SW1, the second switch SW2, the fourth switch SW4, the ninth switch SW9, the tenth switch SW10, and the twelfth switch SW12 are switched to the off state.

In the antenna mode, the first end 112a of the first loop electrode 112 is electrically connected to the first signal line SL1 through the corresponding switch circuit C1. The second end 112b of the first loop electrode 112 is electrically connected to the third end 114a of the second loop electrode 114 through the corresponding switch circuit C1. The fourth end 114b of the second loop electrode 114 is electrically connected to the fifth end 116a of the third loop electrode 116 through the corresponding switch circuit C1, and the sixth end 116b of the third loop electrode 116 is electrically connected to the sixth signal line SL6 through the corresponding switch circuit C1. In some embodiments, in the antenna mode, the first signal line SL1 and the sixth signal line SL6 are suitable for transmitting and/or receiving antenna signals. In some embodiments, in the antenna mode, the sixth signal line SL6 and the first signal line SL1 are electrically connected to the working voltage, and operate in the alternating current (AC) mode.

In the antenna mode, the second signal line SL2, the third signal line SL3, the fourth signal line SL4, and the fifth signal line SL5 are not directly electrically coupled to the touch antenna unit 110a. In the antenna mode, the first loop electrode 112, the second loop electrode 114, and the third loop electrode 116 may be used as antennas that are electrically connected to each other. For example, the first loop electrode 112, the second loop electrode 114, and the third loop electrode 116 may be used as near-field communication (NFC) antennas and may provide high frequency signals.

FIG. 3C is a schematic view of a touch antenna unit and a switch circuit in an interval mode according to an embodiment of the disclosure.

In the spacer mode, the first loop electrode 112, the second loop electrode 114, and the third loop electrode 116 are floating or electrically connected to the ground voltage. For example, in FIG. 3C, the first switch SW1 to the twelfth switch SW12 are all switched to the off state. In the interval mode, the first loop electrode 112, the second loop electrode 114, and the third loop electrode 116 do not form a complete circuit loop and are floating.

In other embodiments, the first loop electrode 112, the second loop electrode 114 and the third loop electrode 116 are electrically connected to ground voltage by adjusting the signals on the first signal line SL1 to the sixth signal line SL6. For example, in other embodiments, the first switch SW1 to the twelfth switch SW12 have the same state in the interval mode and the touch mode (i.e., the first switch SW1, the second switch SW2, the fourth switch SW4, the ninth switch SW9, the tenth switch SW10, and the twelfth switch SW12 are switched to the on state, and the third switch SW3, the fifth switch SW5, the sixth switch SW6, the seventh switch SW7, the eighth switch SW8, and the eleventh switch SW11 are switched to the off state). At the same time, the ground voltage (or 0V) is applied to the first signal line SL1 to the sixth signal line SL6 so that no current flows through the first loop electrode 112, the second loop electrode 114, and the third loop electrode 116.

In other embodiments, the first switch SW1 to the twelfth switch SW12 have the same state in the interval mode and the antenna mode (i.e., the third switch SW3, the fifth switch SW5, the sixth switch SW6, the seventh switch SW7, the eighth switch SW8, and the eleventh switch SW11 are switched to the on state, and the first switch SW1, the second switch SW2, the fourth switch SW4, the ninth switch SW9, the tenth switch SW10, and the twelfth switch SW12 are switched to the off state). At the same time, the ground voltage is applied to the first signal line SL1 and the sixth signal line SL6 so that no current flows through the first loop electrode 112, the second loop electrode 114, and the third loop electrode 116.

Figure 4:
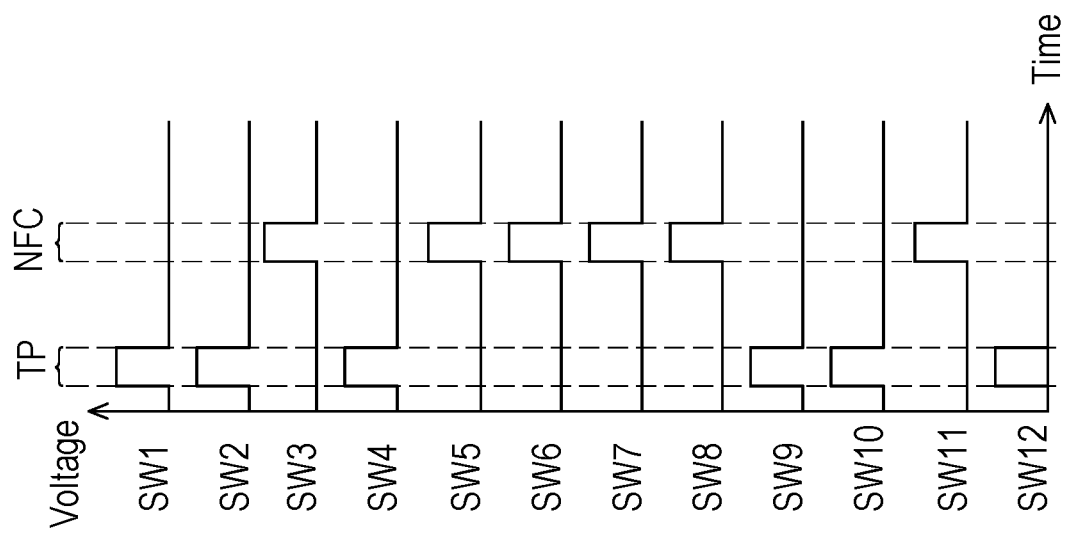
FIG. 4 is a signal waveform diagram of a switch circuit according to an embodiment of the disclosure.

FIG. 4 is a signal waveform diagram of a switch circuit according to an embodiment of the disclosure. In FIG. 4, the switch is in the on state at a high voltage and the switch is in the off state at a low voltage. For example, the first switch SW1 to the twelfth switch SW12 are transistors, and FIG. 4 shows the gate voltages of the transistors. When the gate voltage is at a high voltage, the transistor is in the on state; when the gate voltage is at a low voltage, the transistor is in the off state.

Referring to FIG. 3A, FIG. 3B, and FIG. 4, the touch antenna unit and the corresponding switch circuit may be switched between the touch mode TP and the antenna mode NFC by adjusting the on and off state of the first switch SW1 to the twelfth switch SW12.

Figure 5:
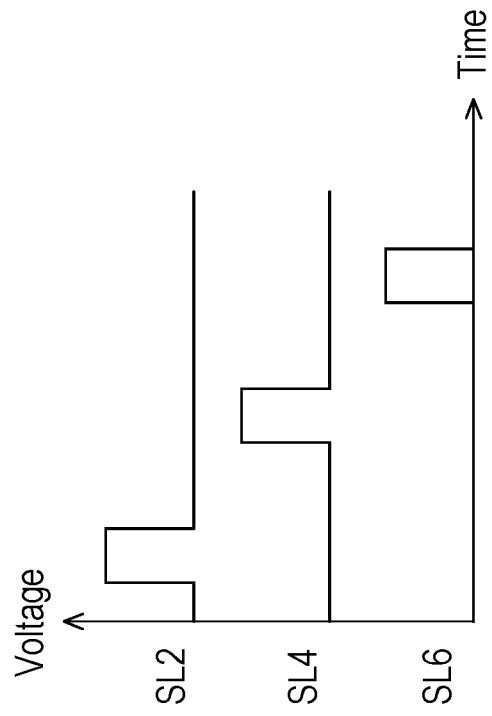
FIG. 5 is a signal waveform diagram of a second signal line, a fourth signal line, and a sixth signal line according to an embodiment of the disclosure.

FIG. 5 is a signal waveform diagram of a second signal line SL2, a fourth signal line SL4, and a sixth signal line SL6 according to an embodiment of the disclosure. Referring to FIG. 3A, FIG. 4, and FIG. 5 at the same time, during the time in the touch mode TP, signals are respectively provided to the second signal line SL2, the fourth signal line SL4, and the sixth signal line SL6.

Returning to FIG. 2A, in some embodiments, one or more of the touch antenna units and the corresponding one or more switch circuits are switched to the touch mode, and another one or more touch antenna units and the corresponding another one or more switch circuits are switched to the antenna mode.

For example, in the same frame time, the touch antenna unit 110a and the switch circuit C1 are switched to the touch mode, and the touch antenna unit 110c and the switch circuit C3 are switched to the antenna mode at the same time. In order to prevent the touch signal and the antenna signal from interfering with each other in the same frame time, the touch antenna unit 110b and the switch circuit C2 are switched to the interval mode, so that the touch antenna unit 110a in the touch mode is not adjacent to the touch antenna unit 110c in the antenna mode.

In other embodiments, in the same frame time, the touch antenna units 110a, 110b, and 110c and the switch circuits C1, C2, and C3 are all switched to the touch mode, and in the next frame time, the touch antenna units 110a, 110b, and 110c and the switch circuits C1, C2, and C3 are all switched to the antenna mode. In some embodiments, in the same frame time, the touch antenna units 110a and 110c and the switch circuits C1 and C3 are all switched to the antenna mode, and the touch antenna unit 110b and the switch circuit C2 are switched to the interval mode at the same time, so that the touch antenna units 110a and 110c in the antenna mode are not adjacent to each other, to reduce the mutual interference between the antenna signals.

In some embodiments, the touch antenna units 110a, 110b, 110c and the switch circuits C1, C2, and C3 are all switched between the touch mode, the interval mode, and the antenna mode, so that each of the touch antenna units of the touch device 10 has a touch function and an antenna function.

Figure 6:
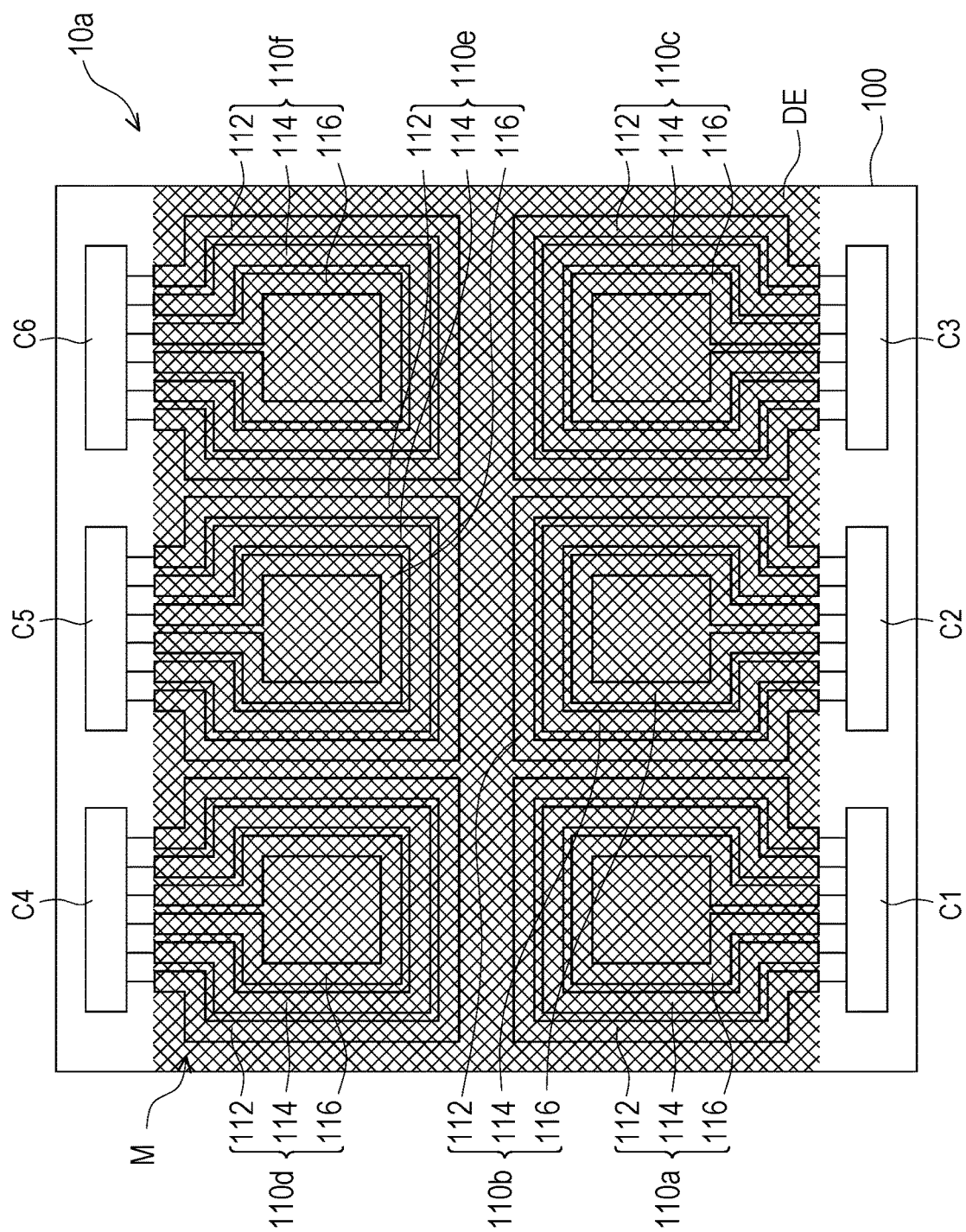
FIG. 6 is a top schematic view of a touch device according to an embodiment of the disclosure.

FIG. 6 is a top schematic view of a touch device according to an embodiment of the disclosure. It is noted that the embodiment of FIG. 6 uses the reference numerals and a part of the contents of the embodiment of FIG. 2A and FIG. 2B, and the same or similar reference numerals are used to denote the same or similar elements, and the description of the same technical content is omitted. For the description of the omitted portion, reference may be made to the foregoing embodiment, and details are not described herein.

The difference between the touch device 10a of FIG. 6 and the touch device 10 of FIG. 2A is that the touch device 10a includes six touch antenna units 110a, 110b, 110c, 110d, 110e, and 110f and six switch circuits C1, C2, C3, C4, C5, and C6.

Referring to FIG. 6, the touch antenna units 110a, 110b, 110c, 110d, 110e, and 110f are respectively electrically connected to the switch circuits C1, C2, C3, C4, C5, and C6.

In this embodiment, the end points of the first loop electrode 112, the second loop electrode 114, and the third loop electrode 116 of the touch antenna units 110a, 110b, and 110c are all located on the same side (i.e., the lower side of the metal mesh structure M in FIG. 6), and the end points of the first loop electrode 112, the second loop electrode 114, and the third loop electrode 116 of the touch antenna units 110d, 110e, and 110f are all located on the same side (i.e., the upper side of the metal mesh structure M in FIG. 6). Therefore, the wiring space between the touch antenna units 110a, 110b, and 110c and the switch circuits C1, C2, and C3 and the wiring space between the touch antenna units 110d, 110e, and 110f and the switch circuits C4, C5, and C6 may be reduced, to obtain the advantage of a narrow border.

In some embodiments, in the same frame time, the touch antenna units of a first portion are switched to the touch mode, the touch antenna units of a second portion are switched to the antenna mode, and the touch antenna units of a third portion are switched to the interval model. The touch antenna units of the first portion are not adjacent to the touch antenna units of the second portion. For example, the touch antenna units 110a and 110c and the switch circuits C1 and C3 are switched to the touch mode, the touch antenna unit 110e and the switch circuit C5 are switched to the antenna mode, and the touch antenna units 110b, 110d, and 110f and the switch circuits C2, C4, and C5 are switched to the interval mode.

In other embodiments, in the same frame time, the touch antenna unit 110f and the switch circuit C6 are switched to the touch mode, the touch antenna unit 110a and the switch circuit C1 are switched to the antenna mode, and the touch antenna units 110b, 110c, 110d, and 110e and switch circuits C2, C3, C4, and C5 are switched to the interval mode.

In other embodiments, in the same frame time, the touch antenna units 110a, 110b, 110c, 110d, 110e, and 110f and the switch circuits C1, C2, C3, C4, C5, and C6 are all switched to the touch mode, and in the next frame time, the touch antenna units 110a, 110b, 110c, 110d, 110e, and 110f and the switch circuits C1, C2, C3, C4, C5, and C6 are all switched to the antenna mode.

To sum up, the display device of the disclosure includes multiple touch antenna units, and the touch antenna units have both the antenna function and the touch function. Therefore, in addition to reducing the manufacturing cost of the device, the problem of mutual interference between the antenna and the touch device may be improved.

What is claimed is:

1. A display device, comprising:
   a substrate;
   a plurality of touch antenna units, arrayed above the substrate,
   wherein each of the touch antenna units comprises:
      a first loop electrode, completely located in a display area of the display device, and having a first end and a second end;
      a second loop electrode, wherein the first loop electrode surrounds the second loop electrode, the second loop electrode has a third end and a fourth end; and
      a plurality of switch circuits, wherein each of the switch circuits is electrically connected to the first end and the second end of the first loop electrode in a corresponding touch antenna unit and the switch circuits are respectively electrically connected to the third end and the fourth end of the second loop electrode in the corresponding touch antenna unit.

2. The display device according to claim 1, further comprising:
   a plurality of dummy electrodes, located between the first loop electrode and the second loop electrode.

3. The display device according to claim 1, wherein each of the touch antenna units and a corresponding switch circuit comprises a touch mode and an antenna mode, wherein:
   in the touch mode, the first end of the first loop electrode is electrically connected to a first signal line through the corresponding switch circuit, the second end of the first loop electrode is electrically connected to a second signal line through the corresponding switch circuit, the third end of the second loop electrode is electrically connected to a third signal line through the corresponding switch circuit, and the fourth end of the second loop electrode is electrically connected to a fourth signal line through the corresponding switch circuit; and
   in the antenna mode, the first end of the first loop electrode is electrically connected to the first signal line through the corresponding switch circuit, and the second end of the first loop electrode is electrically connected to the third end of the second loop electrode through the corresponding switch circuit.

4. The display device according to claim 3, wherein each of the touch antenna units and the corresponding switch circuit further comprises an interval mode, wherein in the interval mode, the first loop electrode and the second loop electrode are floating or electrically connected to a ground voltage.

5. The display device according to claim 3, wherein each of the touch antenna units further comprises:
   a third loop electrode, wherein the second loop electrode surrounds the third loop electrode, the third loop electrode has a fifth end and a sixth end, and the switch circuits are respectively electrically connected to the fifth end and the sixth end of the third loop electrode in the corresponding touch antenna units.

6. The display device according to claim 4, wherein
   in the touch mode, the fifth end of the third loop electrode is electrically connected to a fifth signal line through the corresponding switch circuit, and the sixth end of the third loop electrode is electrically connected to a sixth signal line through the corresponding switch circuit; and
   in the antenna mode, the fourth end of the second loop electrode is electrically connected to the fifth end of the third loop electrode through the corresponding switch circuit, and the sixth end of the third loop electrode is electrically connected to the sixth signal line through the corresponding switch circuit.

7. The display device according to claim 6, wherein each of the switch circuits comprises a first switch, a second switch, a third switch, a fourth switch, a fifth switch, a sixth switch, a seventh switch, an eighth switch, a ninth switch, a tenth switch, an eleventh switch, and a twelfth switch, wherein:
   an end of the first switch and an end of the third switch are electrically connected to the second end of the corresponding first loop electrode, and another end of the first switch is electrically connected to the second signal line;
   an end of the fourth switch and an end of the sixth switch are electrically connected to the fourth end of the corresponding second loop electrode;
   another end of the third switch is electrically connected to an end of the second switch, an end of the fifth switch, and another end of the fourth switch, and another end of the second switch is electrically connected to the fourth signal line;
   another end of the fifth switch is electrically connected to an end of the seventh switch;
   another end of the sixth switch is electrically connected to an end of the eighth switch;
   another end of the eighth switch and an end of the tenth switch are electrically connected to the fifth end of the corresponding third loop electrode;
   another end of the tenth switch is electrically connected to an end of the ninth switch, an end of the eleventh switch, and another end of the seventh switch, and another end of the ninth switch is electrically connected to the fifth signal line; and
   another end of the eleventh switch and an end of the twelfth switch are electrically connected to the third end of the corresponding second loop electrode, and another end of the twelfth switch is electrically connected to the third signal line.

8. The display device according to claim 1, wherein the first loop electrode comprises metal mesh.

9. The display device according to claim 1, wherein the switch circuits are located in a border area of the display device.

10. The display device according to claim 1, wherein the switch circuits are disposed in a chip or a circuit board.

11. The display device according to claim 1, further comprising:
a liquid crystal panel, wherein the substrate is attached onto the liquid crystal panel.

12. The display device according to claim 1, wherein the first loop electrode overlaps a plurality of pixels in the display area.

13. A driving method of a display device, comprising:
providing a display device, comprising:
a substrate;
a plurality of touch antenna units, arrayed above the substrate, wherein each of the touch antenna units comprises:
a first loop electrode, completely located in a display area of the display device, and having a first end and a second end; and
a second loop electrode, wherein the first loop electrode surrounds the second loop electrode, and the second loop electrode has a third end and a fourth end; and
a plurality of switch circuits, wherein each of the switch circuits is electrically connected to the first end and the second end of the first loop electrode, and the third end and the fourth end of the second loop electrode in a corresponding touch antenna unit, wherein each of the touch antenna units comprises a touch mode and an antenna mode;
switching one of the touch antenna units and a corresponding switch circuit to the touch mode; and
switching another one of the touch antenna units and another one of the corresponding switch circuits to the antenna mode.

14. The driving method of the display device according to claim 13, wherein
in the one of the touch antenna units in the touch mode, the first end of the first loop electrode is electrically connected to a first signal line through the corresponding switch circuit, the second end of the first loop electrode is electrically connected to a second signal line through the corresponding switch circuit, the third end of the second loop electrode is electrically connected to a third signal line through the corresponding switch circuit, and the fourth end of the second loop electrode is electrically connected to a fourth signal line through the corresponding switch circuit; and
in the another one of the touch antenna units in the antenna mode, the first end of the first loop electrode is electrically connected to the first signal line through the corresponding switch circuit, and the second end of the first loop electrode is electrically connected to the third end of the second loop electrode through the corresponding switch circuit.

15. The driving method of the display device according to claim 13, wherein the touch antenna units of a first portion are switched to the touch mode, the touch antenna units of a second portion are switched to the antenna mode, and the touch antenna units of a third portion are switched to an interval model, the touch antenna units of the third portion in the interval mode are floating or electrically connected to a ground voltage.

16. The driving method of the display device according to claim 15, wherein the touch antenna units of the first portion are not adjacent to the touch antenna units of the second portion.

* * * * *